E. J. DROUILLARD.
CONE ROLLING MACHINE.
APPLICATION FILED FEB. 27, 1920.
1,350,859.
Patented Aug. 24, 1920.
2 SHEETS—SHEET 1.
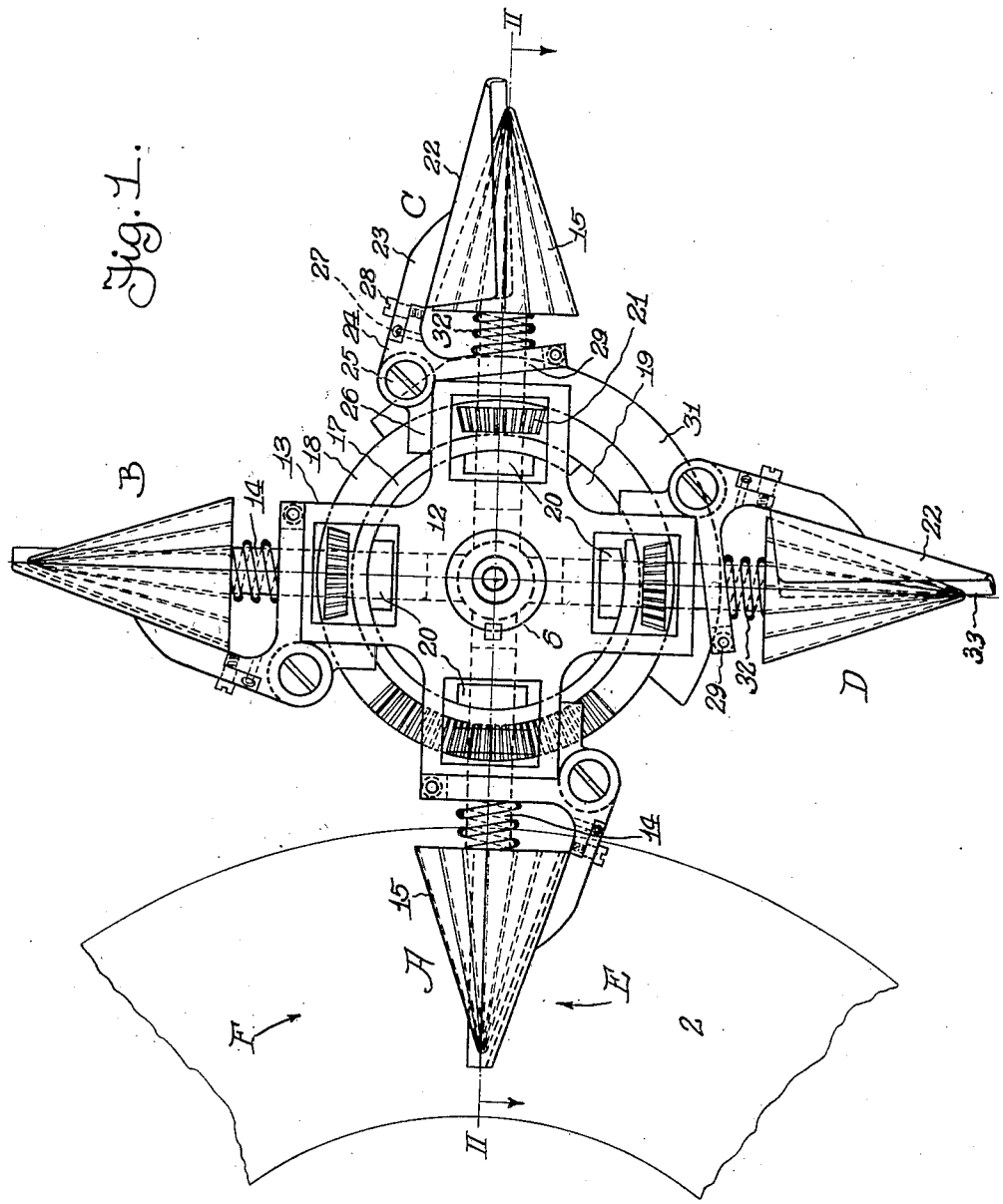
Inventor
Elzear Joseph Drouillard,
by
Atty's.

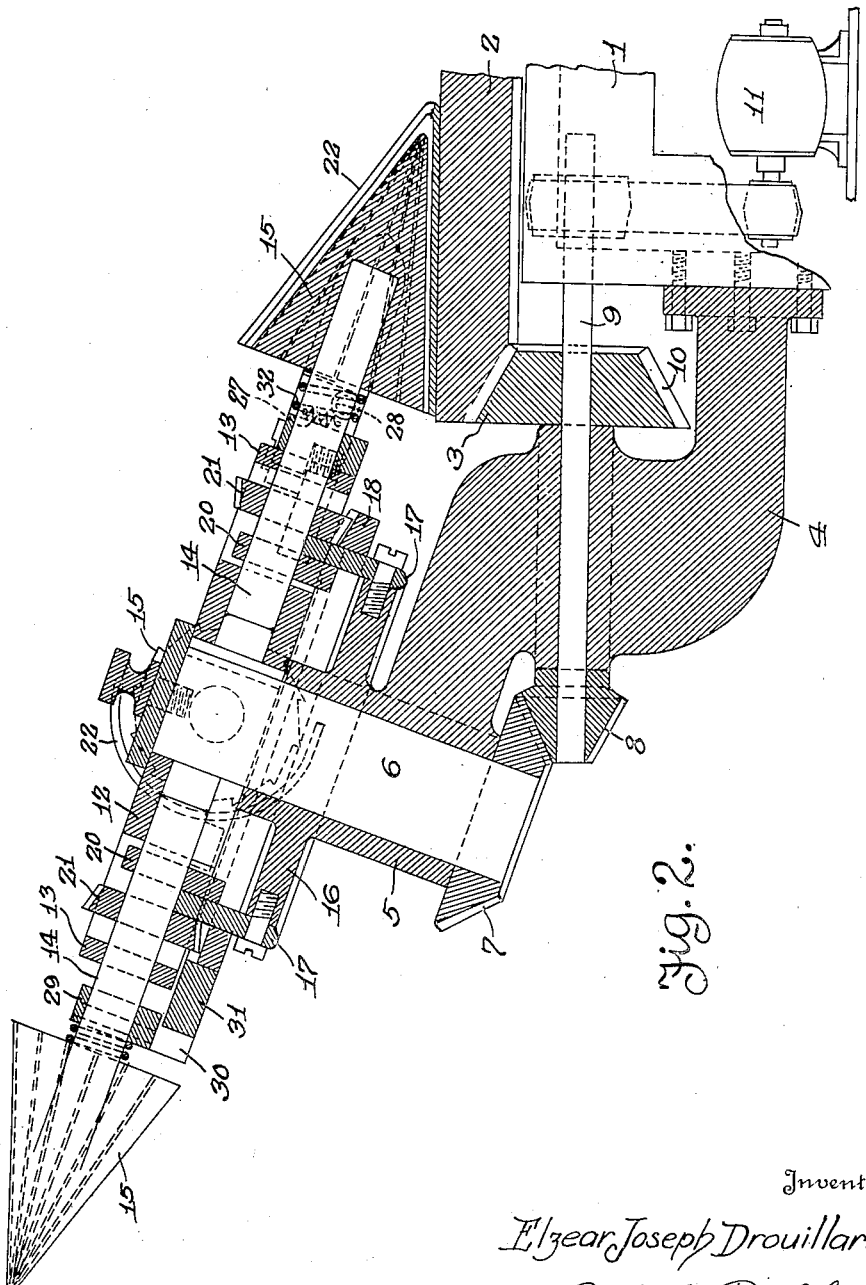

UNITED STATES PATENT OFFICE.

ELZEAR JOSPH DROUILLARD, OF DETROIT, MICHIGAN.

CONE-ROLLING MACHINE.

1,350,859.      Specification of Letters Patent.      Patented Aug. 24, 1920.

Application filed February 27, 1920. Serial No. 361,844.

*To all whom it may concern:*

Be it known that I, ELZEAR JOSPH DROUILLARD, a citizen of the United States of America, residing at Detroit, in the county of Wayne and State of Michigan, have invented certain new and useful Improvements in Cone-Rolling Machines, of which the following is a specification, reference being had therein to the accompanying drawings.

This invention relates to batter-baking machines and has special reference to certain improvements in such machines for baking receptacles for ice cream, commonly known as ice-cream cones. A good example of such machine is shown in Patent No. 1,196,174 granted Aug. 29, 1916, the machine including *interalia*, a series of baking plates or grids disposed on a planetary table and adapted to receive a predetermined quantity of batter which is baked during the movement of the table. With this type of machine it is customary for an operator or attendant to manipulate molds or cores, generally made of wood, to shape the baked batter into a cone. When the upper baking plates are elevated or opened, the attendant will place the mold on the baked batter with one hand and with the fingers of the other hand raise the edge of the baked batter from the hot plate on to the mold and by turning or rotating the mold cause the baked batter to be formed about the mold and assume a conical or mold shape. Such practice requires skill and undivided attention and care, otherwise the hands are burned or the cones improperly formed. However, even with the best of attention and dexterity on the part of an operator the fingers are burned and blistered, and it is difficult to find girls or laborers who will attend such a machine.

My improvement resides in positive and reliable means, as will be hereinafter set forth, for picking up and molding the baked batter on a machine as mentioned above, the improvement being in the form of an automatic device applicable to the above mentioned machine, without material change or modification in the machine, and when the device is installed it is unnecessary for an operator to touch the baking plates or grids of the machine. The device also obviates the necessity of using wood molds and saves the time incident to the cooling of baked batter on such molds so that the same will be properly shaped and may be removed.

My improvement may be considered as a cone molding device wherein novel means is employed for gathering baked batter while plastic or freshly baked and after shaping or molding the batter ejecting it as a cone which will maintain its shape. The device permits of a better grade of batter being used than is customary and consequently I can make better ice cream cones, for instance cones having a taste of cake compared to bread. This and other advantages will be apparent to those skilled in the art of baking ice cream cones or receptacles intended for holding ice cream or other edibles.

Reference will now be had to the drawings wherein—

Figure 1 is a plan of the cone molding device, and

Fig. 2 is an enlarged cross sectional view of the same taken on the line II—II of Fig. 1.

The reference numeral 1 denotes a portion of the frame of a batter baking machine, for instance the frame of that type of machine shown in Patent No. 1,196,174, previously referred to. In this type of machine, the frame 1 supports a rotatable or planetary table 2 and it is on this table that batches or quantities of batter are deposited to spread out and bake as a flat cake or sheet of a size to correspond with the particular size of cone or receptacle to be produced. The batter is ordinarily deposited at one side of the table and by the time it reaches the opposite side or another location it has been properly baked and must be removed from the table, for instance in the manner set forth in the beginning.

In order that my improvement may be used the peripheral edges of the table 2 are provided with a circular rack 3 and in new machines this rack may be made integral with the table, as shown, in Fig. 2, but with the machine already in use the rack may be suitably attached to the table.

Suitably connected to the frame 1 is an angle bracket 4 having an angularly disposed bearing 5 for a shaft 6 and the lower end of said shaft has a beveled gear wheel 7 meshing with a similar wheel 8 on a driven shaft 9, journaled in the bracket 4. The driven shaft 9 at the inner side of the bracket 4 has a beveled gear wheel 10 meshing with the table rack 3, and the shaft 9 may be driven from an electric motor 11 or any suitable source of power. It is now apparent that with the motor 11 in operation that the shaft 6 will be revolved in timed relation to the rotary movement of the table 2.

On the upper end of the shaft 6 is keyed or otherwise mounted a head 12 and the plane of this head is at an angle to the top of the table 2. The head 12 is formed with a plurality of radially disposed housings 13 and in said housings are radially disposed reciprocatory and rotary mold arms 14 which have the outer ends thereof provided with fixed inner molds or cores 15. These inner molds may be of any desired shape but for producing ice cream cones or similar receptacles said molds are conical and have the walls thereof fluted or shaped so as to impart a desired configuration to a molded cone, but such configuration must not interfere with the removal of the cone or product from the inner mold or core.

The bearing 5 affords an annular support 16 for a combined inner cam 17 and a rack 18, said inner cam having a gap 19. Engaging the inner cam are heads 20 on the arms 14 and when said heads move into and out of the gap 19 of the cam the arms 14 are reciprocated, such movement being sufficient to loosen or eject cones from the inner molds or cores.

On the arms 14 are gear wheels or pinions 21 meshing with the rack 18 and when the head 12 is bodily revolved by the shaft 6 the individual arms 14 are rotated. The rack 18 may be segmental so that each arm is rotated when in a defined location, for instance over or adjacent the table 2, as shown.

Associated with each inner mold or core is an outer mold or guide 22 that is semi-conical shaped, that is, it is curved and tapered so as to confront approximately a longitudinal section of the inner mold or core. It has a beveled or scraper edge 33 to engage the top of the table 2, under the edge of baked batter or cake thereon, lift the edge of the cake into engagement with the inner mold or core 15 and cause the same to be wound about the inner mold as it is revolved. The outer mold or guide is carried by a yieldable arm 23 forming part of a bell crank 24 pivotally mounted, as at 25 on a bracket 26, carried by each housing 13. The yieldable arm 23 is supported by the pivot 25 of the bell crank 24 and has a coiled retractile spring 27 retaining said arm normally closed or against the bell crank, while an adjustable screw 28 permits of the arm 23 being set relative to the bell crank and at a desired angle or position relative to another arm 29 of the bell crank. This arm 29 of the bell crank has a depending roller 30 engaging an outer cam 31 carried by the rack 18, as best shown in Fig. 1 and with the roller 30 in engagement with the cam 31 the outer mold or guide 22 is retained in an open position relative to the inner mold or core 15, so that a molded cone or product may be removed from the inner mold.

The arms 14 extend through the bell crank arms 29 and encircling the arms 14, between the arms 29 and the molds 15 are coiled expansion springs 32. The expansive force of these springs retains the heads 20 of the arms 14 normally in engagement with the inner cam 17, and causes the arms 14 to be projected outwardly when the heads 20 enter the cam gap 19. The closing movement of the outer mold or guides 22 relative to the inner molds or cores 15 is limited by the bell crank arms 29 engaging the housings 13 when the rollers 30 are released by the outer cam 31, otherwise the cam 31 holds the arms 29 so that the springs 32 may act against said arm and project the arms 14 when the heads 20 reach the cam gap 19.

Considering Fig. 1, and assuming that my device is revolving in a direction of the arrow E and the table 2 in the direction of the arrow F, then the mold generally designated A is receiving a cake from the table 2. The inner mold is revolving by reason of its pinion 21 engaging the segmental rack 18, and the cake is being curled or rolled about the inner mold and is being guided thereon by the outer mold.

The mold generally designated B has moved from over the table 2 and the inner mold has ceased to rotate, so that the cake may set, cool, and conform to the shape of the inner mold.

The mold generally designated C has had its bell crank arm 29 encounter the outer cam 31 and the outer mold or guide 22 has been opened relative to the inner mold or core 15, so that the finished product is simply supported on the inner mold and will eventually fall therefrom. By the bell crank 29 encountering the cam 31 the spring 32 has been placed under additional tension and as the mold C is bodily moved the head 20 eventually reaches the gay 19, when the expansive force of the spring 32 causes the mold arm 14 to be projected outwardly, by an abrupt action, which causes the cone or finished product to be discharged from between the molds.

The mold generally designated D has discharged a molded cone and the head 20 has engaged the inner cam 17 so that the inner mold is retracted. The bell crank arm 29 is eventually released by the outer cam 31 and the outer mold 22 closed, so that when the mold D reaches the table 2 it may engage the edge of the cake and manipulate it as described in connection with the mold A.

By placing my device at an angle relativ to the table 2 the cones can be discharged at a convenient place and the operations performed by one mold in no wise interferes with what is taking place in connection with the other molds. The manner of forming a cone permits of a sugar cake batter being used, as there is no danger of the baked cake adhering to the molds, since pressure is not used, for instance, as in machines where the cones are pressed or molded, consequently I can produce a fine quality of goods.

It is thought that the operation and utility of my improvement will be apparent without further description, and while in the drawings there is illustrated a preferred embodiment, it is to be understood that the structural elements are susceptible to such variations and modifications as fall within the scope of the appended claims.

What I claim is:—

1. The combination of a batter baking means, a rotary mold adapted to remove baked batter from said means and impart a shape thereto, and means adapted to rotate said mold.

2. The combination set forth in claim 1, wherein the last mentioned means rotates said mold and said batter baking means in timed relation.

3. The combination of batter baking means, a plurality of molds adapted to be successively moved relative to said batter baking means to individually gather batter and shape it, and means for bodily moving said molds.

4. The combination set forth in claim 3, wherein each mold is rotated for a period of the bodily rotation of said molds.

5. The combination of batter baking means, a rotary inner mold adapted to remove baked batter from said means and impart a shape thereto, and an outer mold adapted to guide the baked batter on to the inner mold.

6. The combination set forth in claim 5, wherein the outer mold is movable to and from the inner mold.

7. The combination of a batter baking table, a mold adapted to swing over said table and remove baked batter therefrom and shape it, and means associated with said mold to guide batter thereon.

8. The combination set forth in claim 7, wherein means swings said mold from over said table to a plane higher than the table.

9. The combination of a batter baking table, a guide adapted to move on to and off of said table and scrape baked batter therefrom and means in said guide adapted to shape baked batter therein.

10. The combination set forth in claim 9, wherein said means is reciprocatory and rotary.

11. The combination of a rotary table adapted to hold cakes, a rotary head at the side of said table and actuated in unison therewith and a plurality of molds carried by said head and adapted to successively remove batter from said table and shape it.

12. The combination set forth in claim 11, wherein each mold has movement imparted thereto by and during a rotary movement of said head.

In testimony whereof I affix my signature in the presence of two witnesses.

ELZEAR JOSPH DROUILLARD.

Witnesses:
  KARL H. BUTLER,
  ANNA M. DORR.